United States Patent
Schiavina et al.

(10) Patent No.: US 9,902,509 B2
(45) Date of Patent: Feb. 27, 2018

(54) APPARATUS WITH FACING BELL MEMBERS FOR MODIFIED-ATMOSPHERE PACKAGING OF PRODUCTS CONTAINED IN TRAYS

(75) Inventors: Andrea Schiavina, Correggio (IT); Massimiliano Vaccari, Reggio Emilia (IT)

(73) Assignee: GRUPPO FABBRI VIGNOLA S.p.A., Vignola (IT)

( * ) Notice: Subject to any disclaimer, the term of this patent is extended or adjusted under 35 U.S.C. 154(b) by 895 days.

(21) Appl. No.: 14/131,013

(22) PCT Filed: Jul. 3, 2012

(86) PCT No.: PCT/EP2012/062935
§ 371 (c)(1),
(2), (4) Date: Mar. 28, 2014

(87) PCT Pub. No.: WO2013/004699
PCT Pub. Date: Jan. 10, 2013

(65) Prior Publication Data
US 2014/0260086 A1 Sep. 18, 2014

(30) Foreign Application Priority Data
Jul. 7, 2011 (IT) .............................. BO2011A0403

(51) Int. Cl.
*B65B 31/02* (2006.01)
*B65B 7/16* (2006.01)

(52) U.S. Cl.
CPC .............. *B65B 7/16* (2013.01); *B65B 31/028* (2013.01)

(58) Field of Classification Search
CPC ....... B65B 7/16; B65B 31/028; B65B 31/043; B65B 9/04; B65B 55/18
See application file for complete search history.

(56) References Cited

U.S. PATENT DOCUMENTS 3,992,850 A * 11/1976 Vetter ................... B65B 31/021
                                                    53/510
4,685,274 A * 8/1987 Garwood .............. B65B 31/021
                                                    426/129
(Continued)

FOREIGN PATENT DOCUMENTS

| BO | 2010 A 00211 | 4/2010 | |
| JP | 52 042161 | 3/1977 | |
| WO | WO 2011018391 A1 * | 2/2011 | ........... B65B 31/028 |

OTHER PUBLICATIONS

International Search Report for PCT/EP2012/062935 dated Sep. 12, 2012.
(Continued)

*Primary Examiner* — Andrew M Tecco
(74) *Attorney, Agent, or Firm* — Stetina Brunda Garred and Brucker

(57) ABSTRACT

Apparatus with facing bell members for modified-atmosphere packaging of products contained in trays, comprising at least three circuits: a first circuit and a second circuit (24, 25) which are connected to the main chamber (P) enclosing the internal volume of the trays and open out in different positions (23, 23') of this volume and a third circuit (17) connected to the internal chambers (2, 9) of the bell members (1, 8) and these circuits are intercepted by respective valve means (28, 128, 18, 118) so as to be initially all connected to the vacuum means (21, 121) and then the said first circuit (24) is closed, while the said second circuit (25) is connected to the means (26) for introducing the service gases which, entering into the tray, force the remaining air out so as to occupy a small buffer formed by the said second closed circuit (24, 28). The third circuit (17) is connected via associated valve means (118) to means (22) for gradual pressurization, using also atmospheric air, in order to bal-
(Continued)

ance the internal pressurization of the tray with the service gases.

5 Claims, 2 Drawing Sheets

(56) References Cited

U.S. PATENT DOCUMENTS

| | | | | |
|---|---|---|---|---|
| 5,271,207 | A * | 12/1993 | Epstein | B65B 31/043 |
| | | | | 53/403 |
| 5,718,101 | A * | 2/1998 | Noel | B65B 7/164 |
| | | | | 53/300 |
| 6,912,828 | B1 * | 7/2005 | Yamay | B65B 31/028 |
| | | | | 53/300 |
| 7,600,358 | B2 * | 10/2009 | Natterer | B65B 31/028 |
| | | | | 426/396 |
| 9,162,825 | B2 * | 10/2015 | Vaccari | B65G 25/02 |
| 2005/0257501 | A1 * | 11/2005 | Natterer | B65B 7/164 |
| | | | | 53/432 |
| 2008/0104930 | A1 * | 5/2008 | Sparakowski | B65B 7/164 |
| | | | | 53/432 |
| 2011/0072764 | A1 * | 3/2011 | Daniek | B26D 7/2614 |
| | | | | 53/556 |

OTHER PUBLICATIONS

Written Opinion of the International Searching Authority for PCT/EP2012/062935 dated Sep. 12, 2012.

* cited by examiner

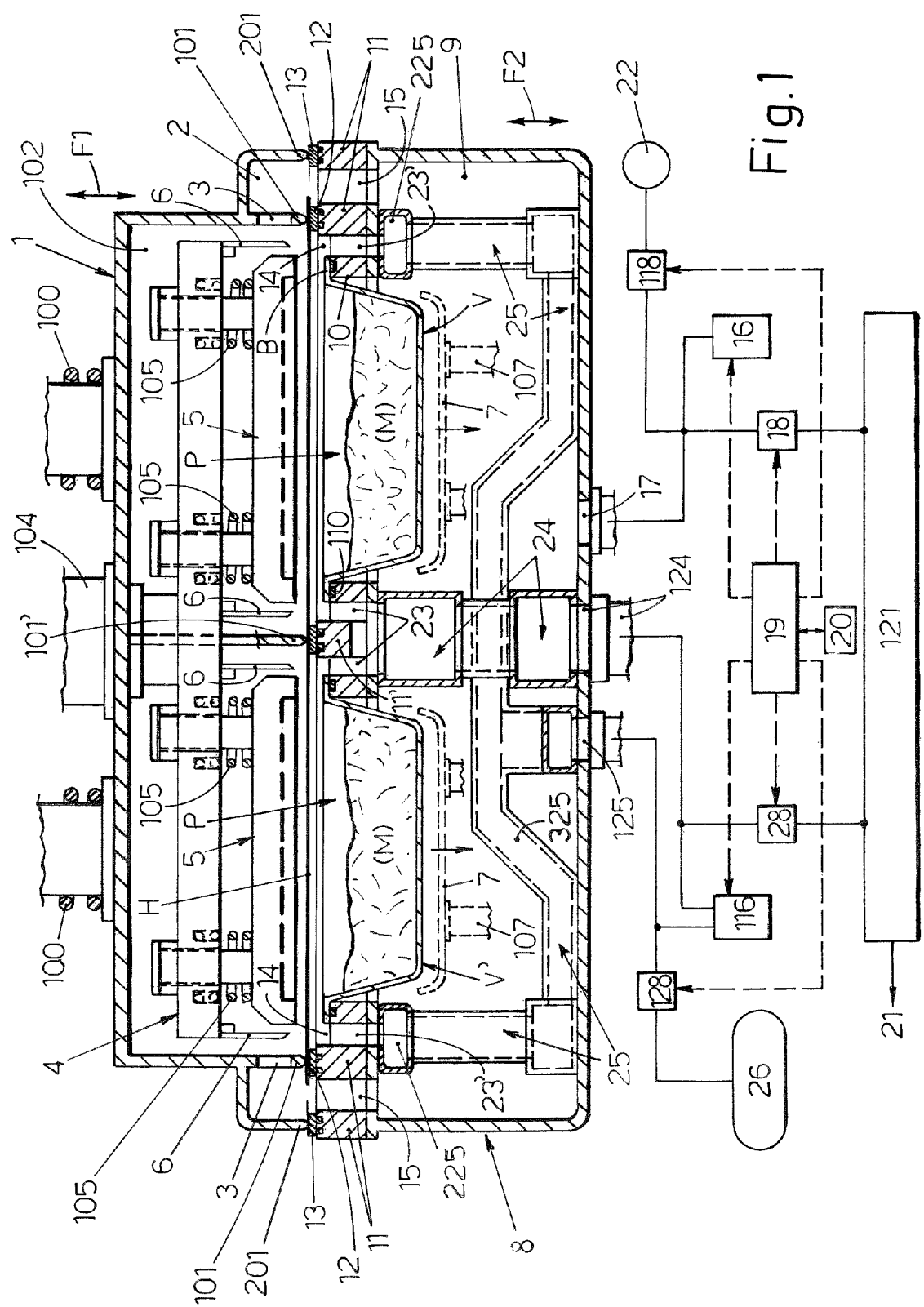

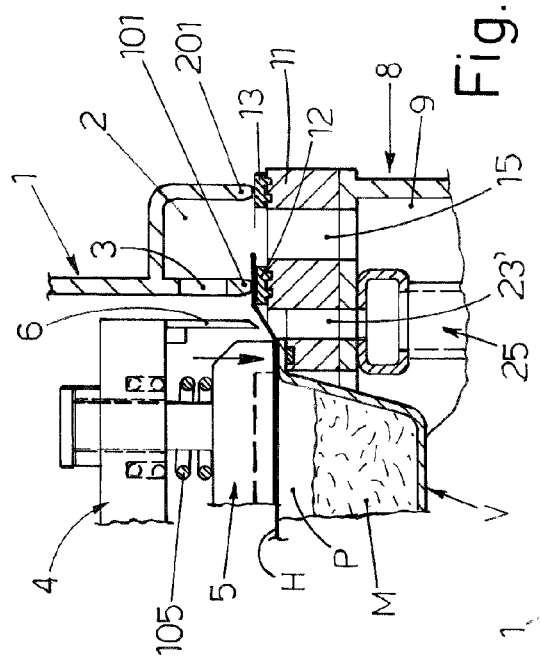
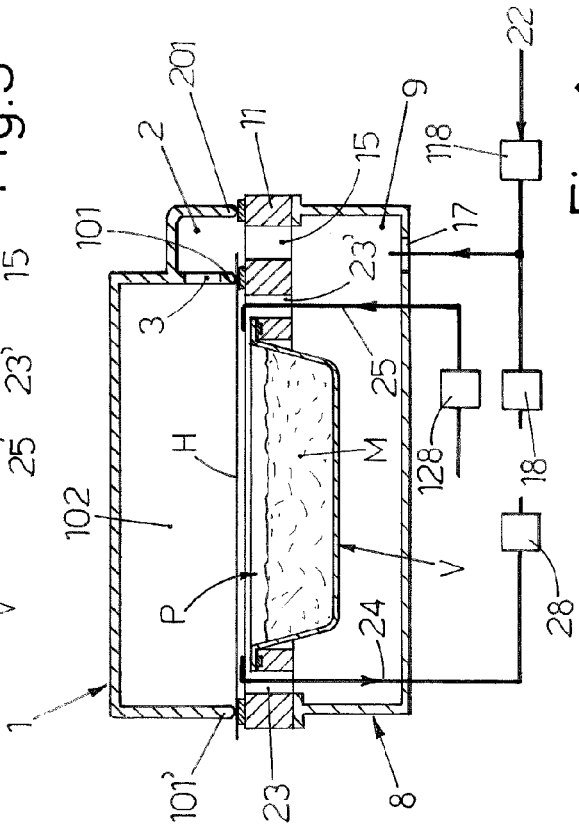
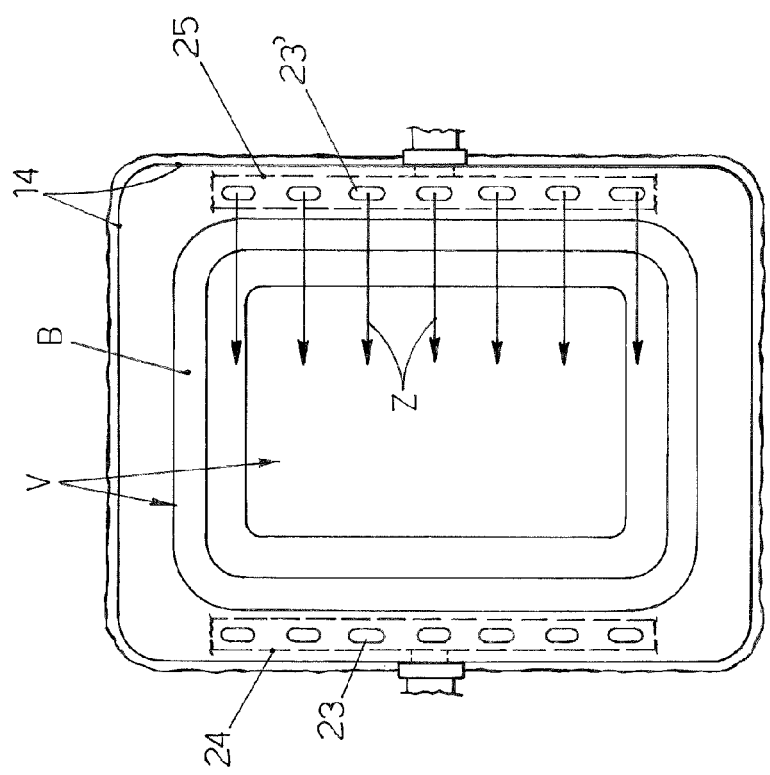

APPARATUS WITH FACING BELL MEMBERS FOR MODIFIED-ATMOSPHERE PACKAGING OF PRODUCTS CONTAINED IN TRAYS

The invention relates to an operating unit or apparatus for sealingly welding a closing film onto at least one tray containing a product to be packaged. The apparatus in question is suitable for so-called tray sealers, i.e. machines which weld a film on top of pre-manufactured trays filled with a product to be packaged, for example a food product. The apparatus according to the invention may be classified under IPC B65B31/04 since it is of the type with facing bell members and is able to produce packaging of the type known as MAP (Modified Atmosphere Packages), namely the type where the product is enclosed inside a sealed package containing a modified atmosphere, suitable for ensuring better conservation of the said product, without a substantial difference in pressure between the inside and outside. In order to modify the atmosphere, during a step where the product contained inside the tray is covered with the barrier film for subsequent closing, kept suitably spaced from the perimetral edge of the tray itself, initially the air is removed from inside the tray and then replaced with a modified atmosphere, for example based on nitrogen, carbon dioxide, oxygen and/or other gases.

The prior art closest to the subject-matter in question is that described in Italian patent application No. BO 2010 A 000211 dated 8 Apr. 2010, in the name of the same Applicant, which describes an apparatus with facing bells for modified-atmosphere packaging of products contained in trays, of the type: which comprises a top bell member which is open downwards and contains the welding means and preferably also the means for cutting the barrier film for closing the trays; which comprises a bottom bell member which is open upwards and has a chamber provided with at least one seat for receiving a tray which may be inserted into and extracted from said seat by special means; which comprises means for positioning a taut section of film between the said two bell members and above the trays which are positioned and centred between them; which also comprises means for moving these bell members towards each other so as to close between them the edge of the tray and on top of the latter the said film; and which comprises means for performing in synchronism extraction of the air from the tray and introduction, into the latter, of service gases for conserving the product contained inside the tray, before the subsequent step of welding the film onto the edge of the said tray and subsequent perimetral cutting of the portion of film welded to the said tray. The apparatus in question is characterized in that it comprises means for ensuring that, during the closing step, the said bell members form inside them a main chamber which is defined at the top by the film covering the tray, at the bottom by the said tray with the product and on the sides by any suitable mechanical interface structure which surrounds and connects the perimeter of the said film to the perimeter of the top edge of the tray, said interface structure being provided with holes and/or eyelets which are suitably distributed and positioned on the outside of the tray perimeter and communicate with said main chamber. Some of these holes open out substantially along a portion or a side of the tray and are connected to a first circuit, while others of said holes open out along at least one portion or opposite side of the said tray and are connected to a second circuit which is in turn connected to the internal chambers of the two bell members, means being envisaged for ensuring that, during formation of the vacuum, both the said first circuit and the said second circuit are connected to vacuum forming means which are kept activated for a time interval sufficient to eliminate part of the air from inside the tray and ensure that, in succession or in synchronism, the said first circuit is connected to means for supplying the service gases, while the said second circuit is closed or remains temporarily connected to the vacuum means so as to ensure that the service gas which enters on one side of the tray, via the said first circuit, forces the remaining air inside the said tray out of and/or towards at least an opposite side of the same tray, via the said second circuit which is then pressurised in order to balance the pressure of the service gases introduced into the tray, so as to perform at the same time washing and saturation of the internal volume of the tray, uniformly affecting the whole area of the said main chamber with the film, the tray and the product, which is then closed in sequence using known steps and means for performing welding and final cutting of the said covering film. In the aforementioned prior art, the facing-bell assembly is connected to two circuits: a first circuit connected to the said main circuit coupled to the internal volume of the trays, which during a first step is connected to the vacuum circuit and then to the circuit for delivery of the service gases, and a second circuit which is also coupled to the said main chamber, in opposition to the said first circuit, but which is connected to the internal chambers of the bell members and which, during a first step, is connected to the vacuum and is then closed so as to receive firstly the remaining air from the trays and then a large quantity of the said service gases which are introduced into the trays and which, entering into the internal chambers of the bell members, balance the pressure on the opposite sides of the film to be used for covering the said trays. It is clear how this solution also involves a significant dispersion of the service gases inside the internal chambers of the bell members, which gases, when the bell members are opened, are dispersed in the atmosphere, with the cost-related and technical problems resulting therefrom.

The object of the invention is to limit further the service gases useful for the MAP methods in question and this main technical problem is solved with the solution which is summarised in the accompanying disclosure and is based on the following proposed solution: instead of the said two circuits according to the prior art, at least three circuits are used, i.e. a first circuit and a second circuit which are connected to the main chamber enclosing the internal volume of the trays and open out in different positions of this volume and a third circuit connected to the internal chambers of the bell members and these circuits are intercepted by respective valve means so that they may be initially all connected to the vacuum means and then the said first circuit is closed, while the said second circuit is connected to the means for introducing the service gases which, entering into the tray, force the remaining air out so as to occupy the small buffer formed by said first blind and closed circuit. The third circuit is connected to means for gradual pressurisation, also using atmospheric air, in order to balance the internal pressurisation of the tray with the service gases. As prior art documents the following two documents are further cited: US 2011/072764 A1 (Daniek V Michael et al) and JP 52 042161 U (Jones). Also according said two documents, when the two facing bell members are closed, there is not the formation inside said bell members of two volumes which do not directly communicate which each other, i.e a first volume formed by the said main chamber (P) with the tray and with the covering film and a second volume formed by the internal intercommunicating chambers of the said two bell members.

Further characteristic features of the invention and the advantages arising therefrom will emerge more clearly from the following description of a preferred embodiment thereof illustrated, purely by way of a non-limiting example, in the figures of the two sets of accompanying drawings in which:

FIG. 1 is a cross-sectional view of the two facing bell members during initial closing onto the film and with, inside, product-containing trays to be treated and closed, with a schematic illustration also of the circuit for internal treatment of the said trays;

FIG. 2 shows a schematic and top plan view of a seat of the bottom bell member with inside a tray to be treated and closed;

FIG. 3 shows a main detail of the facing bell members shown in FIG. 1 during the known step of welding of the film onto the edge of the trays;

FIG. 4 shows an operating diagram of the apparatus during the step for washing and saturating the internal volume of a tray with the treatment gases.

In FIG. 1, 1 denotes in its entirety the top bell member provided at the bottom with inner annular edges 101, 101' and an outer annular edge 201 which surrounds the said inner edges and which defines together with the latter an annular chamber 2 which, via openings 3 suitably distributed along the edge 101, communicates with the internal volume 102 of the said bell member 1 which is connected to special vertical guiding and raising/lowering means which are schematically indicated by the double arrow F1 and are not shown in detail since known. The bell member 1 has, arranged internally, a plate 4 of the known type which is connected to specific selective raising and lowering means 104 and which, via respective guiding and spring means 105 arranged in between, supports at the bottom heat-sealing units 5 and carries cutting units 6 which surround externally each sealing unit 5 and which are normally set back from the bottom working front edge of this component. The bell members shown in FIG. 1 are such as to be able to operate simultaneously on two parallel rows of trays V and V', while it is understood that the scope of protection of the invention also embraces bell members which are able to operate on a single row of trays or on a single tray; in this latter case the edge 101' will be flanked by an outer edge 201. 100 denotes known means which dampen closing of the top bell member 1 onto the bottom bell member described further below.

The heat-sealable barrier film H which is used to close sealingly the preformed trays V, V' filled with the product M passes underneath the bell member 1; the trays are positioned by any suitable means underneath the said bell member 1 and correctly centred with the said means 5 and 6, owing also to the fact that they are supported on extractors of the known type 7 which are associated with the bottom bell member 8 by respective guiding and movement means 107. The bottom bell member 8 is on its side connected to specific known raising and lowering means which are schematically indicated by the double arrow F2 and is provided with a chamber 9 having a form and width such as to be able to house the extractors 7 with the trays V, V' when the said bell member is raised (see below) and this chamber is provided at the top with a seat which has an annular mouth 10, usually with an anti-adhesion seal 110, on which the tray V is intended to rest sealingly with the bottom part of its edge B. At a level higher than that engaged by the annular seat 10, the bottom bell member 8 has surfaces 11, 11' with annularly closed seals 12 and 13 which are aligned and situated opposite the edges 101, 101' and 201 of the top bell member 1. An annular groove 14 with suitable characteristics is provided between the annular seat 10 and the surface 11, while the portion of the said surface 11 comprised between the said seals 12 and 13 has vertical openings 15 in the form of holes or eyelets which communicate at the bottom with the chamber 9 and communicate at the top with the internal chamber 2 of the top bell member 1 when the two bell members are closed as can be seen from FIG. 1 (see below). The chamber 9 has a mouth with a duct 17 which, via intercepting units with valve means 18, 118 controlled by a processor 19, may be connected to or disconnected from a buffer 121 in turn connected to a pump 21 forming the vacuum or to and from a unit 22 for controlled supplying of ambient and preferably filtered air which is at atmospheric pressure or compressed (see below). A pressure switch or vacuum switch 16 which sends its data to the processor 19 is branched off the circuit coupled to the duct 17. 20 denotes a unit for programming and optionally also interrogating and controlling the processor 19 and the various components coupled to it.

From FIGS. 1 and 2 it can be seen that the groove 14 which surrounds each annular seat 10 is provided on at least two opposite sides with holes and/or eyelets arranged at least in two facing rows 23, 23'. The rows of holes 23 positioned on the inner sides of the seats 10 are connected to a header 24 of any suitable type which is positioned inside the bell member 8 and which, by means of one or more mouths 124, is connected to an intercepting unit 28 controlled by the processor 19 and coupled to the buffer 121. The rows of outer holes 23' are instead connected to the longitudinal branches 225 of a header 25 which is also housed inside the bottom bell member 8 and which, via branched lines 325, is coupled to at least one mouth 125 connected to an intercepting unit 128 in turn coupled to the means 26 for supplying the service gases to be introduced into the trays. A pressure switch and/or vacuum switch 116 which also sends its data to the processor 19 is provided branched off from the circuit coupled to the said mouth 125.

The apparatus functions in the manner now described. During an intermediate step of the working cycle, the apparatus is in the condition shown in FIG. 1. The trays V, V' with the product M rest with their edge B on the seal 110 of the annular seat 10, the bell members 1 and 8 are closed against each other with their edges 101, 101' and 201 which cooperate with the annular seals 12 and 13 and with a section of film H gripped between the seal 12 and the said edges 101, 101' and suitably raised from the edge B of the tray.

In this way a main chamber P is formed between the trays V, V' and the film H and has, opening out in inside it, on one side the holes 23 and on the other side the holes 23' which are controlled by respective circuits, while the internal chambers of the bell members 1 and 8 may be controlled by means of a third associated circuit. During a first working stage of the apparatus, the ducts 17 coupled to the internal chambers of the bell members and the ducts 24, 124 coupled to the holes 23 are connected via valve means 18 and 28 to the buffer 121 and to the vacuum pump 21. All the other valve means are closed. Air from inside the trays is sucked via the circuit 24, 124 and through the holes 23, while air is also sucked from inside the bell members 1 and 8 via the circuit 17, in such a way that the pressures on opposite sides of the film H are the same and the said film does not modify substantially its arrangement in space. This step is controlled by the processor 19 via pressure switches or vacuum switches 16, 116. Once a sufficient vacuum has been formed inside the trays, the duct 17 of the internal chambers of the bell members is closed along the connection to the suction circuits 21, 121 with closing of the valve 18, and the valve 28 which is coupled to the circuit 24, 124 and which via the holes 23 is connected to the main chamber P of the trays is also closed in synchronism, together with opening, in synchronism, of the valve 128 connecting the circuit 25, 125 to the source 26 supplying the service gases which, as indicated by the arrows Z in FIG. 2, enter inside the trays V through the row of holes 23' and create a saturation front edge which advances in a uniform and laminar manner, without the formation of turbulence, and which forces the remaining air inside the said tray out through the opposite row of holes 23 and into the short circuit 24, 124 which is closed and sealed off by the valve 28, as schematically shown also in FIG. 4. An amount of gas enters into the tray and a corresponding amount of air exits from the same tray and enters into the said short circuit 24, 124, 28 which is initially under a vacuum and for this reason favours washing and the aforementioned saturation and which may advantageously be designed with dimensions so as to act as a storage buffer for the said washing air. In order to ensure that the pressure on the opposite sides of the film H to be used for covering the trays remains substantially balanced in opposition to the pressure which gradually forms inside the said trays, the valve 118 also opens in synchronism with opening of the valve 128 and via the unit 22 introduces air at the correct pressure values into the chambers 102, 2 and 9 of the two bell members 1 and 8, all of this being controlled by means of the pressure switches or vacuum switches 16, 116 and the processor 19.

Once saturation, with the service gases, of the main chamber P with the internal space between the trays and the associated covering film H has been completed, the welding head 5 is lowered as shown in FIG. 3 in order to fix hermetically the said film onto the edge B of the trays V, V' and the valves 128 and 118 are closed in synchronism. In this way the treatment gases saturate rapidly the internal space of the trays with the product to be packaged and remain permanently trapped inside the said trays after the said step of welding the film H on the edge of the same trays. This step is followed by the next step of cutting the film with the downward movement of the means 6 which enter partly inside the annular groove 14, following which the internal chambers of the bell members are brought to atmospheric pressure (if this is not already the case), the means 5 and 6 are raised, the said bell members are moved away from each other, the extractors 7, 7' raise the packaged trays from the seats 10 and known means are activated so as to remove the closed trays and replace them with new trays to be closed and feed the film H forwards in order to remove part of the excess film towards the storage means and arrange a new intact portion of said film on top of the following trays to be closed. By suitably adapting the volumes of the circuits coupled to the main chamber P initially during the depressurization step and subsequently during the step for washing and saturation with the service gases and suitably adjusting the sequential time intervals of the various steps of the aforementioned cycle, it will be possible to reach the optimum condition such that the blind circuit 24, 124, 28 stores substantially only the remaining air of the trays during internal treatment with the service gases, with optionally only a very small part of the front flow of the said gases, with all the obvious advantages of simplification, a faster process and lower costs arising from this condition.

It is understood that the description refers to a preferred embodiment of the invention to which numerous constructional variations and modifications may be made, all of this without thereby departing from the underlying principle of the invention, as described, as illustrated and as claimed below. In the claims, the reference numbers shown in brackets are purely indicative and do not limit the scope of protection of the said claims.

The invention claimed is:
1. An apparatus with facing bell members for modified-atmosphere packaging of products contained in at least one tray, the at least one tray having a top flange, the top flange including a first side and a second side, which is opposite the first side, the apparatus comprising: a top bell member which is open downwards and contains sealing means and means for cutting;
   a barrier film closing the at least one tray;
   a bottom bell member which is open upwards, with a chamber and with at least one seat for receiving at least one tray;
   valves and ducts configured to extract the air from the at least one tray and introduce, into the at least one tray, service gases for conserving the product contained inside the tray, before the apparatus tightly closes and welds the barrier film on the edge of the tray and subsequently cuts the portion of barrier film welded to the tray around the portion's perimeter;
   edges and annular seals mounted on the bell members, the edges and annular seals positioning a taut section of barrier film between the bell members and above the trays, and the edges and annular seals, when the bell members close, ensure the bell members form inside them a main chamber which is defined at the top by the barrier film covering the tray, at the bottom by the tray with the product and on the sides by a combination of an annular mouth of the bottom bell, and the sealing means of the top bell in contact, which surrounds and connects the perimeter of the barrier film to the perimeter of the top edge of the tray; and
   the annular mouth being provided with holes or eyelets, or holes and eyelets in combination, which are suitably distributed and positioned on the outside of the tray perimeter and communicate with the main chamber, characterized in that;
   wherein, when the two bell members are closed, two volumes which do not directly communicate with each other are formed inside said bell members, including:
      a first volume formed by the main chamber with the tray and with the barrier film; and
      a second volume formed by the internal intercommunicating chambers of the two bell members;
   wherein the bell members have a first position spaced apart from one another, and a second position where the top bell member and bottom bell member close between them the edge of the tray and the barrier film;
   wherein said holes open out substantially along the first side and the second side of the top flange, the holes on the first side being connected to a first circuit located in the bottom bell member, and the holes on the second side being connected to a second circuit also located inside the bottom bell member.

2. Apparatus according to claim 1, wherein internal chambers of the bell members are connected together and to at least one third circuit, valves and a controller configured to, via said first and second circuit connected to the main chamber and via said third circuit connected to the internal chambers of the two bell members, produce MAP-type packages without the formation of high vacuums and with a limited use of service gases.

3. Apparatus according to claim 2, wherein the first and second circuits are connected via respective ducts to corresponding valves coupled respectively to suction means and to a source for supplying the service gases for internal processing of the trays, while the third circuit may be connected via corresponding valves to the suction means or to pressurisation means also of the ambient air type, respectively, there being provided means for ensuring that, during formation of the vacuum, the first circuit and the third circuit are connected via the respective valves to the suction means which operate in a first phase of a gas removal and addition cycle, the first phase including the removal of less than all of the air in the internal volume of the tray, the second header is connected to the means for supplying the service gases in a second phase where service gas enters on one side of the tray through the second header pushing the remaining air inside the tray out of the holes on an opposite side of the same tray, through the first circuit which is then closed by the respective valve so as to form a blind buffer circuit which stores the washing air, all of which so as to perform at the same time washing and saturation of the internal volume of the tray and a third phase where only the second circuit is operable to add service gas to fill the remaining internal volume of the tray, thus the air in the internal volume of the tray is replaced with service gas without the formation of vortices and backflows and therefore in a very rapid and reliable manner.

4. Apparatus according to claim 2, characterized in that, when the trays to be packaged are arranged alongside each other in parallel rows, the first circuit is located longitudinally between two adjacent rows of trays and is connected to the rows of said holes positioned laterally and on the inner sides of both rows of trays, while the second circuit has longitudinal branches connected to the rows of outer holes which are positioned laterally and on the outer sides of the two rows of trays and which via branched lines are connected together and to the mouth for connection to the valve means.

5. Apparatus according to claim 1, wherein the volumetric dimensions of the first circuit and the associated circuit for connection to an associated intercepting valve, when the associated intercepting valve is closed, are correlated to the volume of the main chamber of the packages being formed between the two opposite bell members and the sequential time intervals of the various steps of the working cycle of the apparatus are such as to ensure that, during the step for washing and saturating the main chamber with the gases, a blind circuit connected at the outlet of said main chamber stores substantially only the remaining air inside the internal volume of the trays being saturated with the service gases, with optionally only a small part of the front flow of the gases, with all the advantages of simplification, a faster process and lower costs resulting from this condition.

\* \* \* \* \*